United States Patent
Ito

Patent Number: 5,280,390
Date of Patent: Jan. 18, 1994

[54] ZOOM LENS SYSTEM

[75] Inventor: Takayuki Ito, Tokyo, Japan

[73] Assignee: Asahi Kogaku Kogyo K.K., Tokyo, Japan

[21] Appl. No.: 800,113

[22] Filed: Nov. 29, 1991

[30] Foreign Application Priority Data

Nov. 30, 1990 [JP] Japan ................... 2-335943

[51] Int. Cl.$^5$ .................. G02B 15/14; G02B 9/08
[52] U.S. Cl. ................... 359/676; 359/691; 359/692; 359/740
[58] Field of Search .............. 359/642, 672–677, 359/683–690, 691–693, 708, 720, 739–740, 793–797; 375/676–677, 683–693

[56] References Cited

U.S. PATENT DOCUMENTS

| | | | |
|---|---|---|---|
| 4,720,179 | 1/1988 | Ito | 359/692 |
| 4,830,476 | 5/1989 | Aoki | 359/692 |
| 4,936,661 | 6/1990 | Betensky et al. | 359/692 |
| 4,953,957 | 9/1990 | Kobayashi | 359/692 |
| 4,991,945 | 2/1991 | Estelle | 359/692 |

FOREIGN PATENT DOCUMENTS

| | | |
|---|---|---|
| 56-128911 | 10/1982 | Japan . |
| 57-201213 | 12/1982 | Japan . |
| 60-48009 | 3/1985 | Japan . |
| 60-191216 | 9/1985 | Japan . |
| 62-90611 | 4/1987 | Japan . |
| 62-113120 | 5/1987 | Japan . |
| 62-264019 | 11/1987 | Japan . |
| 63-276013 | 11/1988 | Japan . |
| 1-57222 | 3/1989 | Japan . |
| 1-189620 | 7/1989 | Japan . |
| 2-50117 | 2/1990 | Japan . |
| 2-71220 | 3/1990 | Japan . |

Primary Examiner—Bruce Y. Arnold
Assistant Examiner—Thong Nguyen
Attorney, Agent, or Firm—Sughrue, Mion, Zinn Macpeak & Seas

[57] ABSTRACT

A zoom lens system includes, in order from the object side, the first lens group having a positive focal length and the second lens group having a negative focal length. The system performs zooming by changing the distance between the first and second lens groups. The first lens group has a negative lens element on the side closest to the object that has a concave surface of large curvature directed towards the image plane and the first lens group satisfies the specific conditions.

14 Claims, 9 Drawing Sheets

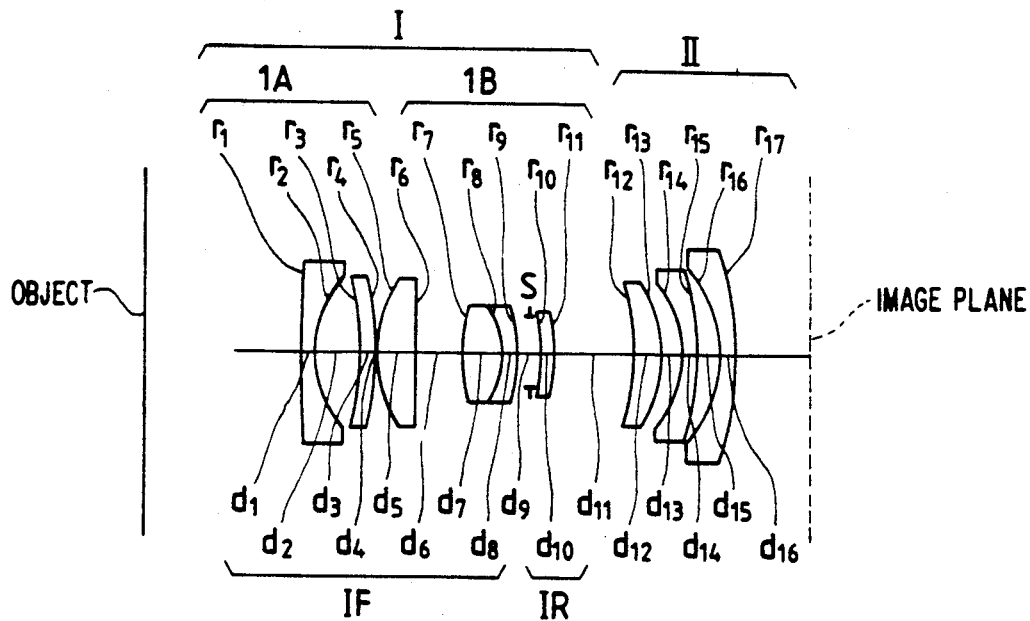
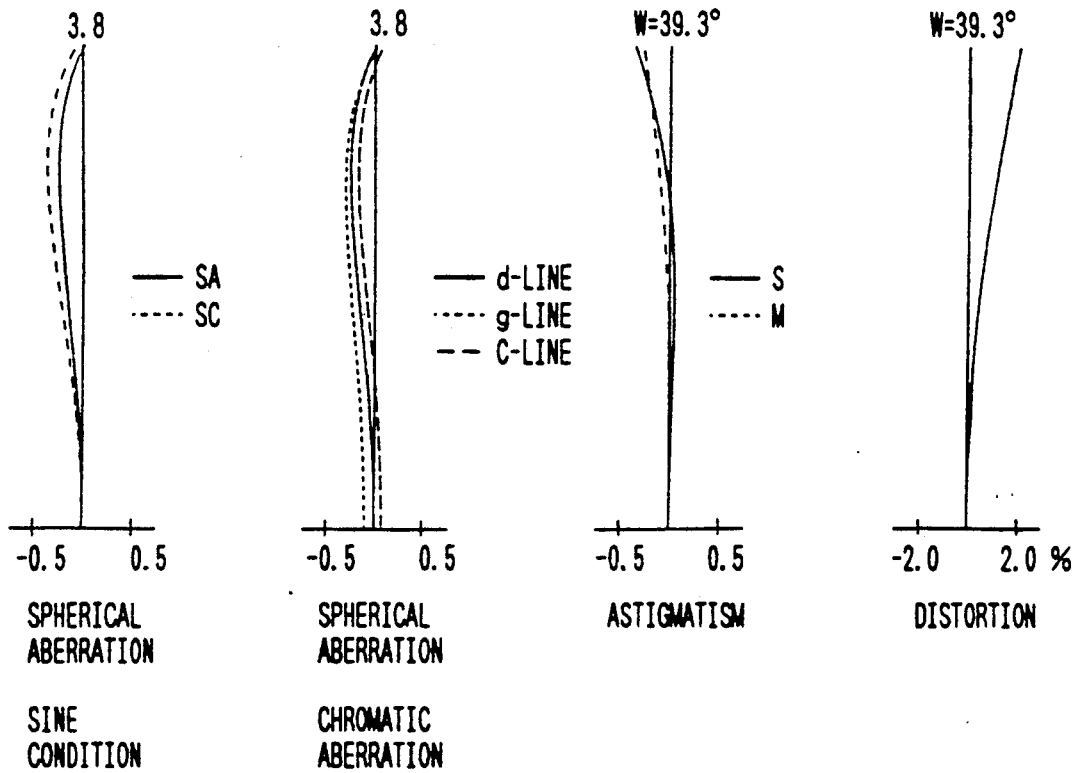

ZOOM LENS SYSTEM

This application is based on and claims priority from Japanese Patent Application No. HEI 2-335943 filed Nov. 30, 1990, the disclosure of which is incorporated by reference herein.

BACKGROUND OF THE INVENTION

The present invention relates to a two-group zoom lens system of telephoto type (hereunder referred to as a "zoom lens system of two-group type") that is characterized by a simple mechanical structure. More particularly, the present invention relates to a zoom lens system that has a smaller backfocus than lens systems for a conventional single-lens reflex camera and that is suitable for use with a compact camera.

Examples of conventional two-group type zoom lens systems are described in Japanese Patent Laid-Open Publications No. SHO 56-128911, No. SHO 57-201213, No. SHO 60-48009, No. SHO 60-191216, etc.

However, all of those conventional zoom lens systems have a small backfocus, so the lenses in the second lens group are too bulky to achieve compactness when the lens system is incorporated into a camera. A further problem with those lens systems is that internal reflections tend to occur between the film surface and the last lens surface.

Japanese Patent Laid-Open Publications No. SHO 62-90611, No. SHO 64-57222, No. SHO 62-113120 and No. SHO 62-264019, disclose two-group type zoom lens systems that have a comparatively large backfocus in spite of their intended use with compact cameras However, all of these zoom lens systems have a half view angle of about 30 degrees at the wide-angle end hence are not suitable for the purpose of taking scenic and other pictures at wide angles.

Japanese Patent Laid-Open Publication No. SHO 63-276013 proposes a zoom lens system that uses a negative lens as the first lens element. However, this negative lens has a distribution of refractive index, so the zoom lens system under consideration cannot be manufactured at low cost in spite of the small number of the lens elements used. A further disadvantage is that the half view angle is as small as 30 degrees.

The most important consideration for wide-angle lenses is how to insure the marginal illumination when the stop diaphragm is effected. Conventional two-group type zoom lens systems are focused by two methods; in one method, a stop diaphragm is provided within the first lens group and the latter is moved for focusing together with the diaphragm; in the second method, a stop diaphragm is provided between the first and second lens groups and only the first lens group is moved for focusing while the diaphragm and the second lens group are fixed. The second approach realizes a system that is mechanically the simpler; However, the height of marginal rays that pass through the diaphragm position at a maximum view angle decreases to make it difficult to insure adequate marginal illumination when the stop diaphragm is effected. If focusing is effected by moving the first lens group altogether regardless of the diaphragm position, significant undercompensation for astigmatism and curvature of the field will occur at near distance.

Japanese Patent Laid-Open Publication No. HEI 1-189620 concerns the focusing of two-group type zoom lens system. However, the zoom lens system described in this patent also has a small half view angle of only about 30 degrees at the wide-angle end and is incapable of assuring adequately wide angles.

SUMMARY OF THE INVENTION

The present invention has been accomplished under these circumstances and has an object to provide a zoom lens system that is of a simple two-group type and which yet is adapted to achieve adequately wide angles by modifying the compositions of the first lens group and the stop diaphragm.

The zoom lens system of the present invention comprises, in order from a object side, the first lens group having a positive focal length and a second lens group having a negative focal length and performs zooming by changing the distance between the first and second lens groups. This lens system is characterized in that the first lens group has a negative first lens element on the side closest to the object that has a concave surface of large curvature directed towards the image plane, the first lens group satisfying the following conditions (a) and (b):

$$-1.5 < fI/f1 < -0.8 \quad (a)$$

$$0.3 < r2/fS < 0.6 \quad (b)$$

where
- fI: the focal length of the first lens group;
- f1: the focal length of the first lens element in the first lens group;
- r2: the curvature radius of the concave surface of the first lens element on the image side; and
- fS: the focal length of the overall system at the wide-angle end.

BRIEF DESCRIPTION OF THE DRAWINGS

In the accompanying drawings:

FIGS. 1, 3, 5, 7, 9, 11, 13, 15 and 17 are simplified cross-sectional views of the zoom lens system at the wide-angle end according to Examples 1–9, respectively, of the present invention, in which I denotes the first lens group, II denotes the second lens group, 1A denotes the lens unit 1A, 1B denotes the lens unit 1B, IF denotes the lens unit IF, IR denotes the lens unit IR, and S denotes the stop diaphragm; and FIGS. 2, 4, 6, 8, 10, 12, 14, 16 and 18 are graphs plotting the aberration curves obtained at the wide-angle end (a), middle-angle end (b) and narrow-angle end (c) with the zoom lens system according to Examples 1–9, respectively.

DESCRIPTION OF THE PREFERRED EMBODIMENTS

Figure 1:
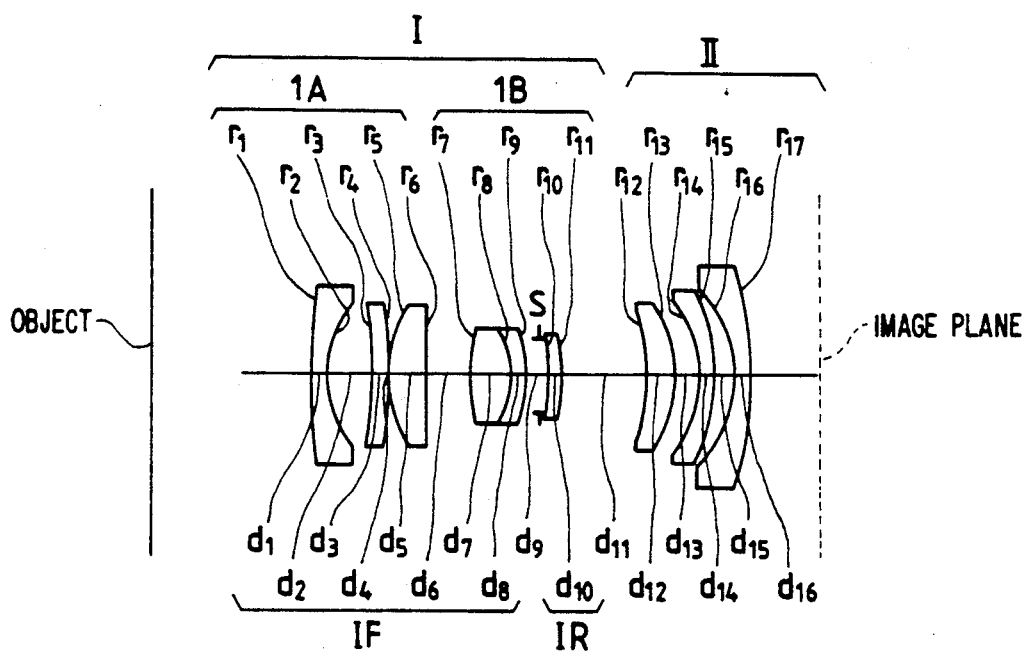

Embodiments of the present invention are described on the following pages.

The zoom lens system of the present invention is of a two-group telephoto type that consists basically of the positive first lens group and the negative second lens group. The first lens group has a negative first lens element provided on the side closest to the object so as to realize a lens arrangement of a retro-focus (retrotelephoto) type. Further, the first lens group satisfies the following conditions (a) and (b):

$$-1.5 < fI/f1 < -0.8 \quad (a)$$

$$0.3 < r2/fS < 0.6 \quad (b)$$

where
- f1: the focal length of the first lens group;
- f1: the focal length of the first lens element in the first lens group;
- r2: the curvature radius of the concave surface of the first lens element on the image side; and
- fS: the focal length of the overall system at the wide-angle end.

This lens composition enables the production of a zoom lens system for use with a compact camera that has a half view angle of about 40 degrees.

Condition (a) relates to the power of the first lens element in the first lens group. If the upper limit of this condition (a) is exceeded, half the view angle that can be attained becomes smaller than about 40 degrees. If the lower limit of condition (a) is not reached, the negative power of the first lens element becomes excessive and the astigmatism that occurs at the wide-angle is overcompensated.

Condition (b) relates to the curvature radius of the concave surface of the first lens element on the image side. If the upper limit of this condition is exceeded, the negative power of the concave surface becomes so small that spherical aberration and astigmatism will be undercompensated. If the lower limit of condition (b) is not reached, those aberrations will be over-compensated.

If focusing is achieved by merely moving the first lens group forward altogether, significant variations will occur in astigmatism when the view angle is increased. Hence, in order to reduce the aberrational variations over the full range from infinity to the shortest distance, a rear lens element 1R of small power is preferably provided in the rear part of the first lens group so that focusing is effected by moving the first lens group in such a way that the distance between lens 1R and the front lens unit if properly changed.

In another embodiment, in order to insure satisfactory optical performance over the full zooming range, the first lens group is preferably composed of a first lens unit 1A on the object side and a positive second lens unit 1B, and a negative first lens element having a concave surface of large curvature on the image side is provided on the side of the lens unit 1A that is the closest to the object whereas a positive lens element having a convex surface of large curvature on the object side is provided on the side of the unit 1A that is the closest to the image plane, and the lens unit 1A preferably satisfies the following conditions (c), (d) and (e). To reduce the aberrational variations over the full zooming range, compensation for aberrations is preferably achieved to some extent within the first lens unit 1A.

| | | |
|---|---|---|
| (c) | $-0.5 < f1/f1A < 0.3$ | |
| (d) | $0.4 < r1A/fS < 0.8$ | |
| (e) | $0.05 < da/fS < 0.4$ | | where
- f1: the focal length of the first lens group;
- f1A: the focal length of the lens unit 1A;
- r1A: the curvature radius of the convex surface on the object side of the lens element on the image side of the lens unit 1A;
- fS: the focal length of the overall system at the wide-angle end: and
- da: the distance from the concave surface on the image side of the first lens element in the lens unit 1A to the convex surface on the object side of the lens element on the image side.

Condition (c) relates to the overall power of the lens unit 1A. Since the negative power of the first lens element in the lens unit 1A is restricted by condition (a), this condition (c) may as well be considered as one that relates indirectly to the positive power of the lens element on the image side of the lens unit 1A. If the lower limit of condition (c) is not reached, the positive power of the lens element of interest on the image side becomes so small that the aberrations that occur in the first lens element on the object side cannot be effectively compensated within the lens unit 1A. If the upper limit of condition (c) is exceeded, the powers of both the negative and positive lens elements will increase to cause higher-order aberrations.

Condition (d) relates to the curvature radius of the convex surface on the object side of the lens element on the image side of lens unit 1A. If the upper limit of this condition is exceeded, the positive power will become so small that the aberrations that occur on the concave surface of side first lens element cannot be effectively compensated for within the lens unit 1A. If the lower limit of condition (d) is not reached, the positive face power will become so great as to cause higher-order aberrations.

Condition (e) relates to the distance between the first lens element in the lens unit 1A and the lens element on the image side. Since the first lens group is of a retrofocus type, this condition (e) also relates to the focal length of the first lens group. If the upper limit of this condition is exceeded, the result is favorable for aberrational compensation but, on the other hand, the overall length of the lens system and the diameter of the first lens element will increase unavoidably. If the lower limit of condition (e) is not reached, the requirement for a wider angle with a shorter focal length cannot be met unless the powers of the fist lens element in the unit 1A and the lens element on the image side are both increased. However, the increase in the powers of those lens elements will cause higher-order aberrations.

In order to reduce the aberrational variations that occur upon zooming and focusing, the lens unit 1B in the first lens group preferably comprises, in order from the object side, a cemented lens that consists of a biconvex lens element and a negative meniscus lens element and that has a divergent cemented interface, a stop diaphragm and a positive lens element 1R, with the following conditions (g) and (h) being satisfied:

$$0.4 < f1/fC < 1.0 \text{(g)}$$

$$0 < f1/f1R < 0.4 \text{(h)}$$

where
- f1: the focal length of the first lens group;
- fC: the composite focal length of the cemented lens in the lens unit 1B; and
- f1R: the focal length of the lens element 1R in the lens unit 1B.

If those conditions (g) and (h) are satisfied, the positive power of the lens unit 1B can be distributed in an effective way to suppress the aberrational variations that can occur during zooming.

Condition (g) relates to the positive power of the cemented lens in the lens unit 1B. If the upper limit of this condition is exceeded, the power of the cemented lens becomes so great that effective power distribution between the cemented lens and the lens element 1R cannot be achieved and great aberrational variations will take place during zooming. If the lower limit of condition (g) is not reached, the optical load on the lens element 1R will unduly increase and great aberrational variations will take place during focusing.

Condition (h) relates to the power of the positive lens element 1R. If the upper limit of this condition is exceeded, the power of the lens element 1R becomes so great as to increase the aberrational variations that can occur during focusing. If the lower limit of condition (h) is not reached, the lens element 1R will have a negative, rather than positive, power and the positive power of the cemented lens will become excessive to cause higher-order aberrations and hence great aberrational variations will occur during zooming.

The lens element 1R is preferably a positive meniscus lens that has a concave surface directed towards the object and that satisfies the following condition (i):

$$-1.5 < r_{1R}/fS < -0.5 \text{ (i)}$$

where $r_{1R}$: the curvature radius of the surface of the lens element 1R on the object side; and fS: the focal length of the overall system at the wide-angle end.

This composition has the advantage that even if aerial distance in front of the lens element 1R changes during focusing, undesired phenomena such as an undercompensated spherical aberration that occurs in the lens elements closer to the object than 1R can be effectively compensated.

Condition (i) relates to the shape of the lens element 1R. If the upper limit this condition is exceeded, the radius of curvature of lens element 1R becomes too small to avoid overcompensation for aberrations. If the lower limit of condition (i) is not reached, the radius of curvature of 1R will so much increase that it become difficult to reduce the aberrational variations that can occur during focusing. In this connection, it should be mentioned that the lens element 1R has such a small power that it will experience only a small change in power even if it is subjected to variations in shape and other factors. Therefore, this lens element may be a plastic lens which inherently has large coefficients of variations in shape and other factors due to changes in temperature and humidity. If desired, the lens element 1R may have an aspheric surface that is divergent and that satisfies the following condition (j) with respect to the reference spherical surface which is defined by the paraxial curvature radius of the aspheric surface:

$$-30 < \Delta I1R < 0 \text{ (j)}$$

where $\Delta I1R$: the amount of variation in the coefficient of the third-order spherical aberration due to the aspheric surface of the lens element 1R (the aberration coefficient is such as is obtained when fS is regarded as unity); and fS: the focal length of the overall system at the wide-angle end.

If this condition is satisfied, the aberrational variations that can take place during focusing can be reduced.

Condition (j) relates to the aspheric surface of the lens element 1R. If the upper limit of this condition is exceeded, the aspheric surface is no longer divergent. If the lower limit of condition (j) is not reached, under compensation for aberrations will occur and, in addition, the amount of asphericity of the aspheric surface will so much increase as to introduce substantial difficulty in lens fabrication.

The amount of variation in the coefficient of the third-order aberration due to the aspheric surface will be described. The shape of the aspheric surface can be generally expressed as follows:

$$x = \frac{cy^2}{1 + \sqrt{1 - c^2 y^2 (1 + K)}} + a_4 y^4 + \sigma_6 y^6 \ldots$$

where

K: conicity constant.

When the focal length f is 1.0, the resultant value is transformed as follows. Namely, substitute the following equations into the above equation:

$$x = x/f$$
$$y = y/f$$
$$c = fc$$
$$A_4 = f^3 a_4$$
$$A_6 = f^5 a_6$$
$$A_8 = f^7 a_8$$
$$A_{10} = f^9 a_{10}$$

Then, the following equation is obtained:

$$x = \frac{cY^2}{1 + \sqrt{1 - c^2 Y^2 (1 + K)}} + A_4 y^4 + A_6 y^6 \ldots$$

where

K: conicity constant.

The second and subsequent terms define the amount of asphericity of the aspheric surface. The relationship between the coefficient A4 of the second term and the coefficient of the third-order aspheric surface $\Phi$ is expressed by:

$$\Phi = 8(N^- - N)A_4$$

where N is the refractive index where the aspheric surface is not provided and $N^-$ is the refractive index where the aspheric surface is provided.

The coefficient of the aspheric surface $\Phi$ provides the following amounts of variation in the coefficients of various kinds of third-order aberration:

$$\Delta I = H^4 \Phi$$
$$\Delta II = h^3 H \Phi$$
$$\Delta III = h^2 H^2 \Phi$$
$$\Delta IV = h^2 H^2 \Phi$$
$$\Delta V = h H^3 \Phi$$

where

I: A spherical aberration coefficient

II: Coma coefficient

III: Astigmatism coefficient

IV: Curved surface coefficient of spherical image absent surface

V: Distortion coefficient h: Height of paraxial on-axis rays passing through each lens surface H: Height of paraxial off-axis rays passing through the center of the pupil.

The shape of the aspheric surface can be expressed by various other equations, but when y is smaller than the paraxial radius of curvature, satisfactory approximation can be achieved by even-order terms alone. Hence, it should be understood that the applicability of the present invention is in no way compromised by merely changing the equations for expressing the shape of aspheric surface.

In yet another embodiment, the lens unit 1A preferably includes at least one aspheric surface that is divergent and that satisfies the following condition (f) with respect to the reference spherical surface defined by the paraxial curvature radius of the aspheric surface:

$$-20 < \Delta I1A < 0(f)$$

where $\Delta I1A$: the amount of variation in the coefficient of the third-order spherical aberration due to the aspheric surface in the lens unit 1A (the aberration coefficient is such as is obtained when fS is regarded as unity); and fS: the focal length of the overall system at the wide-angle end.

This composition is particularly effective for suppressing distortion.

Condition (f) relates to the aspheric surface in the lens unit 1A. The divergent aspheric surface is such that the radius of curvature in the peripheral portion is greater than the paraxial curvature radius if the surface is convex, with the relationship being opposite if the surface is concave. If the upper limit of condition (f) is exceeded, the divergency of the aspheric surface is insufficient to prevent the increase in distortion in the positive direction at the wide-angle end. If the lower limit of condition (f) is not reached, the amount of asphericity will increase to cause not only high-order aberration but also substantial difficulty in lens fabrication. As described in Japanese Patent Laid-Open Publications No. HEI 2-71220, No. HEI 2-50117, etc., it is obvious from the prior art that either a fixed or movable positive or negative lens element having a smaller power than the first and second lens groups may be provided at the back of the second lens group and, hence, this modification is still within the scope of the present invention.

EXAMPLES

Examples 1 to 9 of the zoom lens system of the present invention are described below with reference to data sheets, in which f denotes the focal length, w the half view angle, fB denotes the backfocus, r denotes the radius of curvature of an individual lens surface, d denotes the lens thickness or the aerial distance between adjacent lenses, n denotes the refractive index at the d-line, and v denotes the Abbe number of an individual lens. Symbols $a_4$, $a_6$ and $a_8$ refer to the coefficients of the fourth-, sixth- and eighth-order aspheric surfaces.

EXAMPLE 1

Figure 2A:
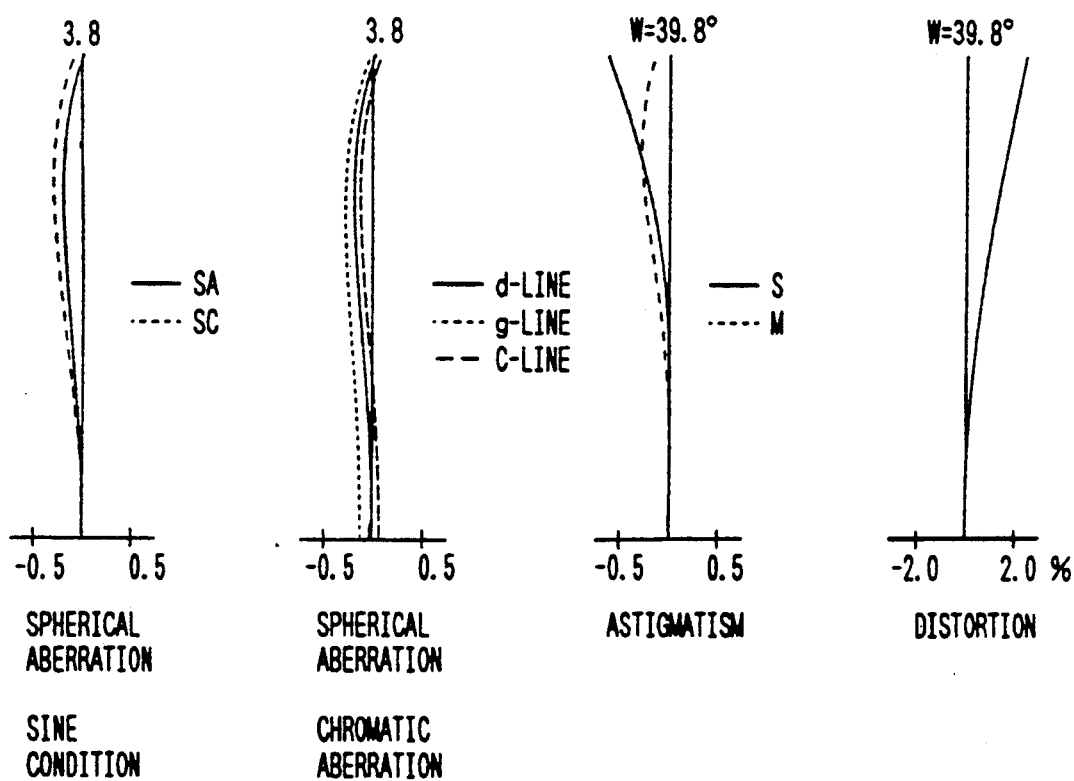

FIG. 1 is a simplified cross-sectional view of the zoom lens system of Example 1 for the case where it is at the wide-angle end. The specific composition of this lens system is shown in Table 1 below. The aberration curves obtained with this lens system are plotted by graphs in FIGS. 2a, 2b and 2c for the respective cases where it is at the wide-angle end, middle-angle end and narrow-angle end.

TABLE 1

FNo. = 1:4.0~7.4  f = 25.35~48.50
ω = 39.8~24.3  fB = 8.78~37.45

| Surface No. | r | d | n | v |
|---|---|---|---|---|
| 1 | 89.909 | 1.400 | 1.83400 | 37.2 |
| 2 | 11.074 | 4.359 | | |
| 3* | −47.870 | 1.600 | 1.73077 | 40.5 |
| 4 | −69.413 | 0.150 | | |
| 5 | 13.803 | 3.425 | 1.68893 | 31.1 |
| 6 | 668.046 | 4.304 | | |
| 7 | 22.032 | 3.818 | 1.48749 | 70.2 |
| 8 | −8.798 | 1.370 | 1.84666 | 23.8 |
| 9 | −14.837 | 2.131 | | |
| 10 | −23.008 | 1.400 | 1.49176 | 57.4 (plastic) |
| 11* | −16.459 | 8.130~1.498 | | |
| 12 | −19.425 | 2.516 | 1.80518 | 25.4 |
| 13 | −12.795 | 2.485 | | |
| 14 | −12.059 | 1.350 | 1.83400 | 37.2 |
| 15 | −19.788 | 1.966 | | |
| 16 | −12.026 | 1.400 | 1.83400 | 37.2 |
| 17 | −37.867 | | | |

| Third Aspherical Surface | Eleventh Aspherical Surface |
|---|---|
| K = 0 | K = 0 |
| $a_4 = -0.37032122 \times 10^{-4}$ | $a_4 = 0.81550022 \times 10^{-4}$ |
| $a_4 = 0.83462240 \times 10^{-7}$ | $a_4 = 0.22286662 \times 10^{-5}$ |
| $a_7 = -0.39441858 \times 10^{-8}$ | $a_4 = -0.31993412 \times 10^{-7}$ |

EXAMPLE 2

FIG. 3 is a simplified cross-sectional view of the zoom lens system of Example 2 for the case where it is at the wide-angle end. The specific composition of this lens system is shown in Table 2 below. The aberration curves obtained with this lens system are plotted by graphs in FIGS. 4a, 4b and 4c for the respective cases where it is at the wide-angle end, middle-angle end and narrow-angle end.

TABLE 2

FNo. = 1:3.9~7.4  f = 25.86~48.50
ω = 39.3~24.3  fB = 9.37~37.25

| Surface No. | r | d | n | v |
|---|---|---|---|---|
| 1 | 166.507 | 1.400 | 1.83500 | 43.8 |
| 2 | 10.924 | 4.404 | | |
| 3* | −29.750 | 1.500 | 1.73077 | 40.5 |
| 4 | −28.694 | 0.150 | | |
| 5 | 13.623 | 3.712 | 1.66047 | 38.4 |
| 6 | −310.028 | 4.545 | | |
| 7 | 24.058 | 3.693 | 1.48749 | 70.2 |
| 8 | −9.206 | 1.400 | 1.84666 | 23.8 |
| 9 | −15.887 | 2.194 | | |
| 10 | −19.365 | 1.400 | 1.49176 | 57.4 (plastic) |
| 11* | −14.762 | 7.556~1.490 | | |
| 12 | −22.566 | 2.699 | 1.80518 | 25.4 |
| 13 | −12.537 | 2.046 | | |
| 14 | −10.937 | 1.350 | 1.83400 | 37.2 |
| 15 | −26.229 | 2.100 | | |
| 16 | −13.217 | 1.400 | 1.83400 | 37.2 |
| 17 | −33.075 | | | |

| Third Aspherical Surface | Eleventh Aspherical Surface |
|---|---|
| K = 0 | K = 0 |
| $a_4 = -0.24093905 \times 10^{-4}$ | $a_4 = 0.79716066 \times 10^{-4}$ |
| $a_6 = 0.78354397 \times 10^{-7}$ | $a_6 = 0.23533852 \times 10^{-5}$ |
| $a_8 = -0.11477075 \times 10^{-8}$ | $a_8 = -0.15660346 \times 10^{-7}$ |

EXAMPLE 3

Figure 5:
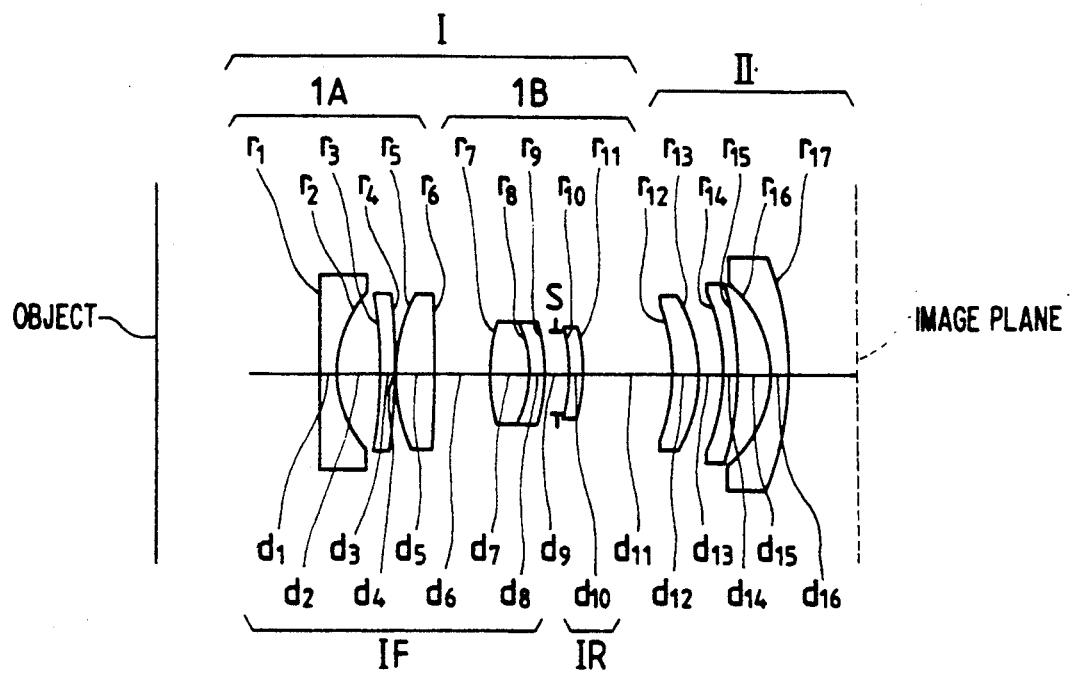
Figure 6A:
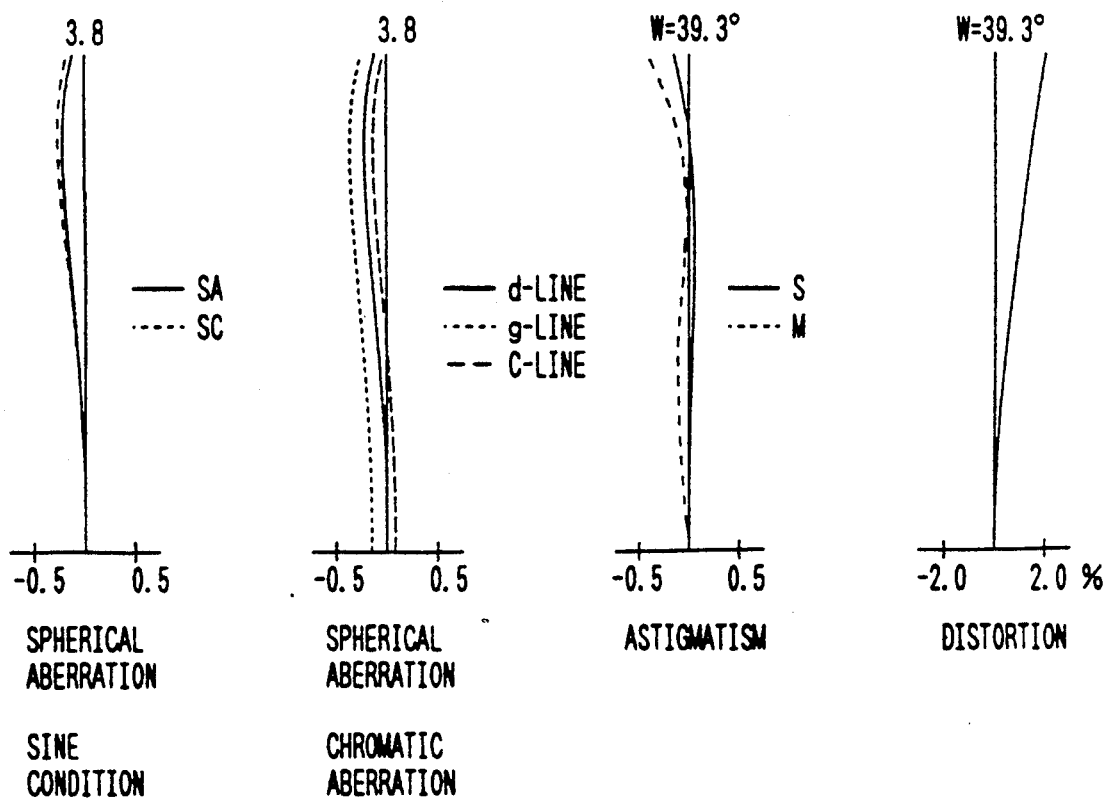

FIG. 5 is a simplified cross-sectional view of the zoom lens system of Example 3 for the case where it is at the wide-angle end. The specific composition of this lens system is shown in Table 3 below. The aberration curves obtained with this lens system are plotted by graphs in FIGS. 6a, 6b and 6c for the respective cases where it is at the wide-angle end, middle-angle end and narrow-angle end.

TABLE 3

FNo. = 1:3.9~7.3  f = 25.90~48.70
ω = 39.3~24.3  fB = 8.50~36.37

| Surface No. | r | d | n | ν |
|---|---|---|---|---|
| 1 | −525.996 | 1.500 | 1.73077 | 40.5 |
| 2* | 10.960 | 4.005 | | |
| 3 | −60.102 | 1.500 | 1.83400 | 37.2 |
| 4 | −71.037 | 0.150 | | |
| 5 | 15.703 | 3.410 | 1.72047 | 34.7 |
| 6 | −484.431 | 5.299 | | |
| 7 | 20.330 | 3.619 | 1.48749 | 70.2 |
| 8 | −10.670 | 1.400 | 1.84666 | 23.8 |
| 9 | −17.722 | 2.272 | | |
| 10 | −17.208 | 1.350 | 1.49176 | 57.4 (plastic) |
| 11* | −13.360 | 8.349~1.552 | | |
| 12 | −18.544 | 2.286 | 1.80518 | 25.4 |
| 13 | −13.991 | 2.434 | | |
| 14 | −18.837 | 1.350 | 1.80610 | 40.9 |
| 15 | −28.759 | 3.161 | | |
| 16 | −11.000 | 1.400 | 1.83400 | 37.2 |
| 17 | −32.119 | | | |

| Second Aspherical Surface | Eleventh Aspherical Surface |
|---|---|
| K = 0 | K = 0 |
| $a_4 = 0.54118651 \times 10^{-5}$ | $a_4 = 0.11905908 \times 10^{-3}$ |
| $a_4 = 0.31939602 \times 10^{-6}$ | $a_6 = 0.23921033 \times 10^{-6}$ |
| $a_4 = -0.34980168 \times 10^{-8}$ | $a_8 = 0.46485914 \times 10^{-8}$ |

EXAMPLE 4

Figure 7:
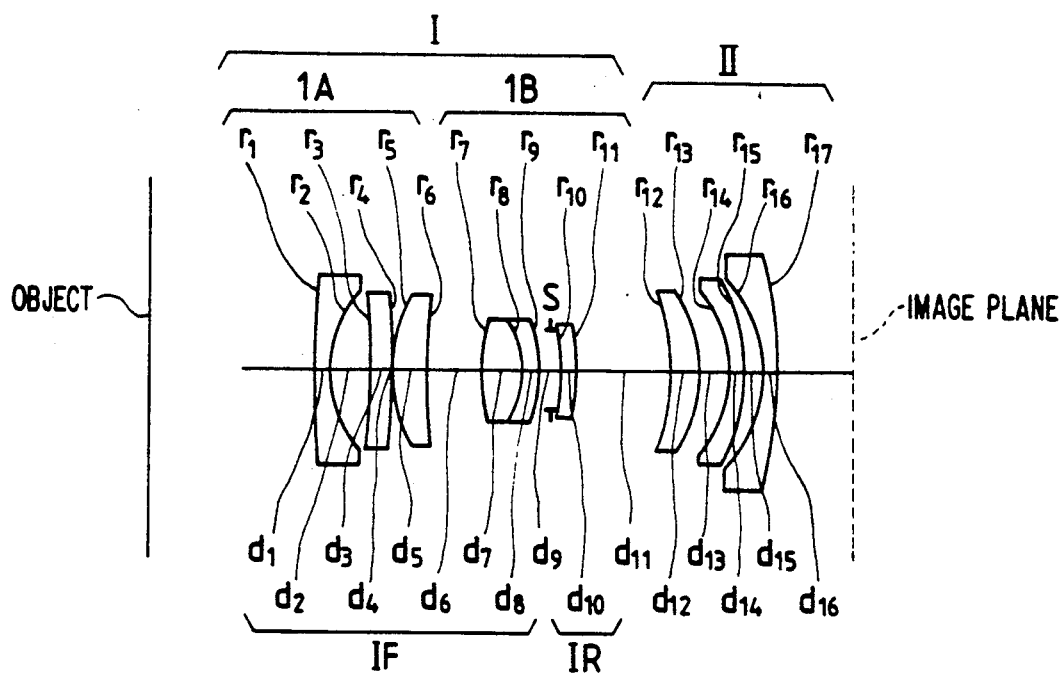
Figure 8A:
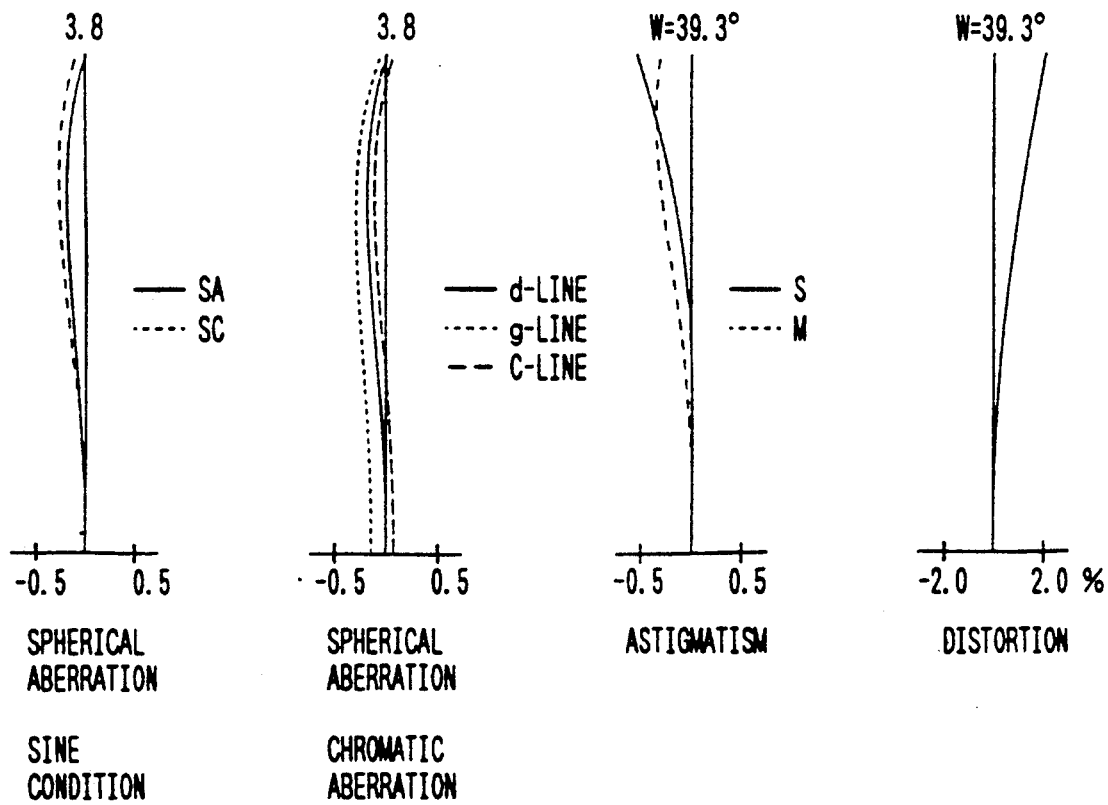

FIG. 7 is a simplified cross-sectional view of the zoom lens system of Example 4 for the case where it is at the wide-angle end. The specific composition of this lens system is shown in Table 4 below. The aberration curves obtained with this lens system are plotted by graphs in FIGS. 8a, 8b and 8c for the respective cases where it is at the wide-angle end, middle-angle end and narrow-angle end.

TABLE 4

FNo. = 1:3.9~7.3  f = 25.87~48.70
ω = 39.3~24.3  fB = 8.74~37.08

| Surface No. | r | d | n | ν |
|---|---|---|---|---|
| 1 | 161.330 | 1.400 | 1.83400 | 37.2 |
| 2 | 11.508 | 3.620 | | |
| 3* | −104.610 | 1.947 | 1.49176 | 57.4 (plastic) |
| 4 | −100.813 | 0.150 | | |
| 5 | 14.399 | 3.160 | 1.71736 | 29.5 |
| 6 | 98.949 | 5.048 | | |
| 7 | 20.087 | 3.771 | 1.48749 | 70.2 |
| 8 | −9.398 | 1.370 | 1.84666 | 23.8 |
| 9 | −15.717 | 2.092 | | |
| 10 | −25.783 | 1.400 | 1.49176 | 57.4 (plastic) |
| 11* | −17.398 | 8.786~1.970 | | |
| 12 | −19.188 | 2.536 | 1.80518 | 25.4 |
| 13 | −13.125 | 2.850 | | |
| 14 | −11.990 | 1.350 | 1.83400 | 37.2 |
| 15 | −18.460 | 1.784 | | |
| 16 | −12.579 | 1.400 | 1.83400 | 37.2 |
| 17 | −41.560 | | | |

| Third Aspherical Surface | Eleventh Aspherical Surface |
|---|---|
| K = 0 | K = 0 |
| $a_4 = -0.32349485 \times 10^{-4}$ | $a_4 = 0.85463783 \times 10^{-4}$ |
| $a_6 = 0.71985252 \times 10^{-7}$ | $a_6 = 0.12715046 \times 10^{-5}$ |
| $a_8 = -0.31742409 \times 10^{-8}$ | $a_8 = -0.17976101 \times 10^{-7}$ |

EXAMPLE 5

Figure 9:
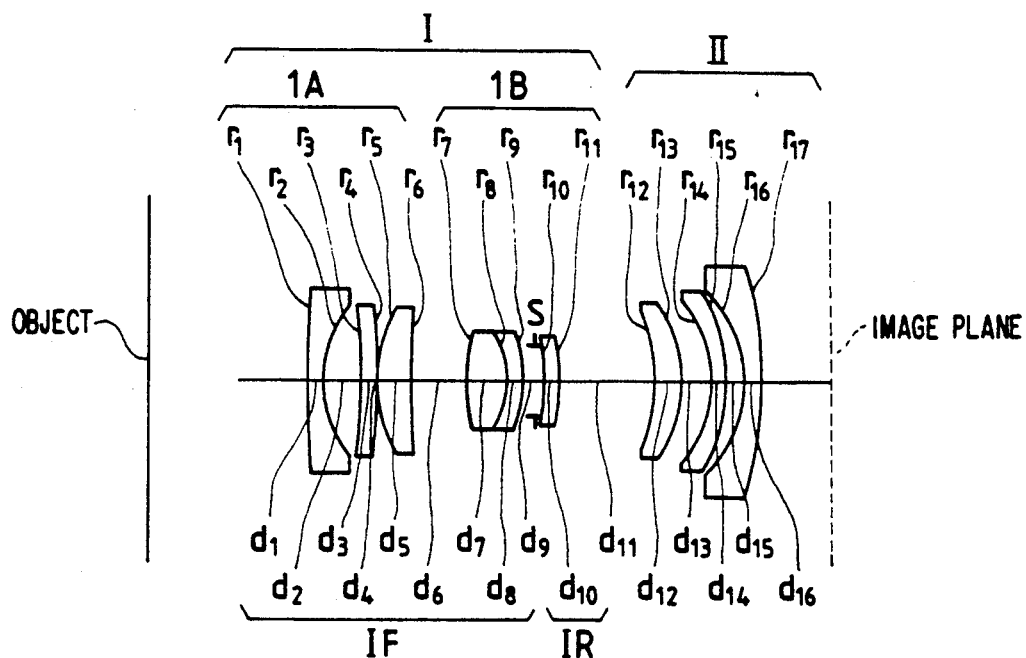
Figure 10A:
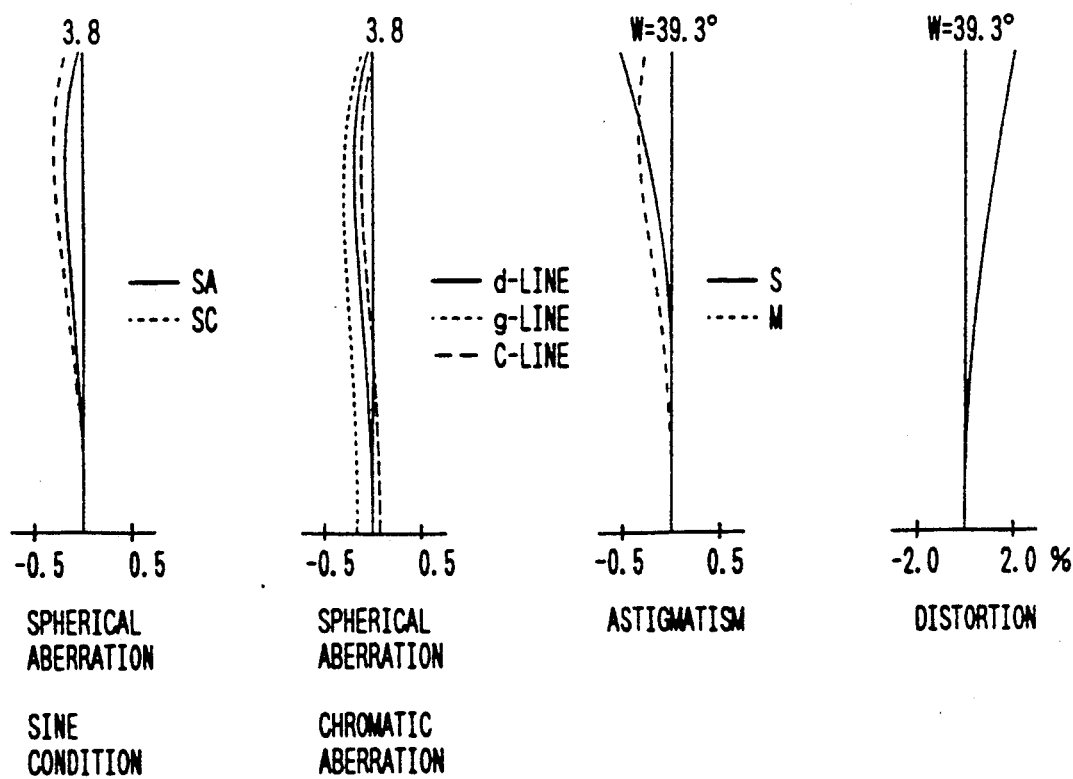

FIG. 9 is a simplified cross-sectional view of the zoom lens system of Example 5 for the case where it is at the wide-angle end. The specific composition of this lens system is shown in Table 5 below. The aberration curves obtained with this lens system are plotted by graphs in FIGS. 10a, 10b and 10c for the respective cases where it is at the wide-angle end, middle-angle end and narrow-angle end.

TABLE 5

FNo. = 1:3.9~7.3  f = 25.89~48.70
ω = 39.3~24.3  fB = 8.64~37.10

| Surface No. | r | d | n | ν |
|---|---|---|---|---|
| 1 | 267.611 | 1.400 | 1.83400 | 37.2 |
| 2 | 11.866 | 3.593 | | |
| 3* | −110.000 | 1.700 | 1.49176 | 57.4 (plastic) |
| 4 | −71.552 | 0.150 | | |
| 5 | 15.058 | 3.155 | 1.71736 | 29.5 |
| 6 | 122.688 | 5.263 | | |
| 7 | 22.977 | 3.703 | 1.48749 | 70.2 |
| 8 | −9.368 | 1.370 | 1.84666 | 23.8 |
| 9 | −15.225 | 2.055 | | |
| 10 | −28.531 | 1.400 | 1.58913 | 61.2 |
| 11* | −19.623 | 9.055~1.966 | | |
| 12 | −19.123 | 2.495 | 1.80518 | 25.4 |
| 13 | −13.406 | 2.978 | | |
| 14 | −12.383 | 1.350 | 1.83400 | 37.2 |
| 15 | −17.214 | 1.757 | | |
| 16 | −12.197 | 1.400 | 1.83400 | 37.2 |
| 17 | −44.061 | | | |

| Third Aspherical Surface | Eleventh Aspherical Surface |
|---|---|
| K = 0 | K = 0 |
| $a_4 = -0.31941806 \times 10^{-4}$ | $a_4 = 0.51933004 \times 10^{-4}$ |
| $a_6 = 0.10516664 \times 10^{-6}$ | $a_6 = 0.85697682 \times 10^{-6}$ |
| $a_8 = -0.30873586 \times 10^{-8}$ | $a_8 = -0.93661558 \times 10^{-8}$ |

EXAMPLE 6

Figure 11:
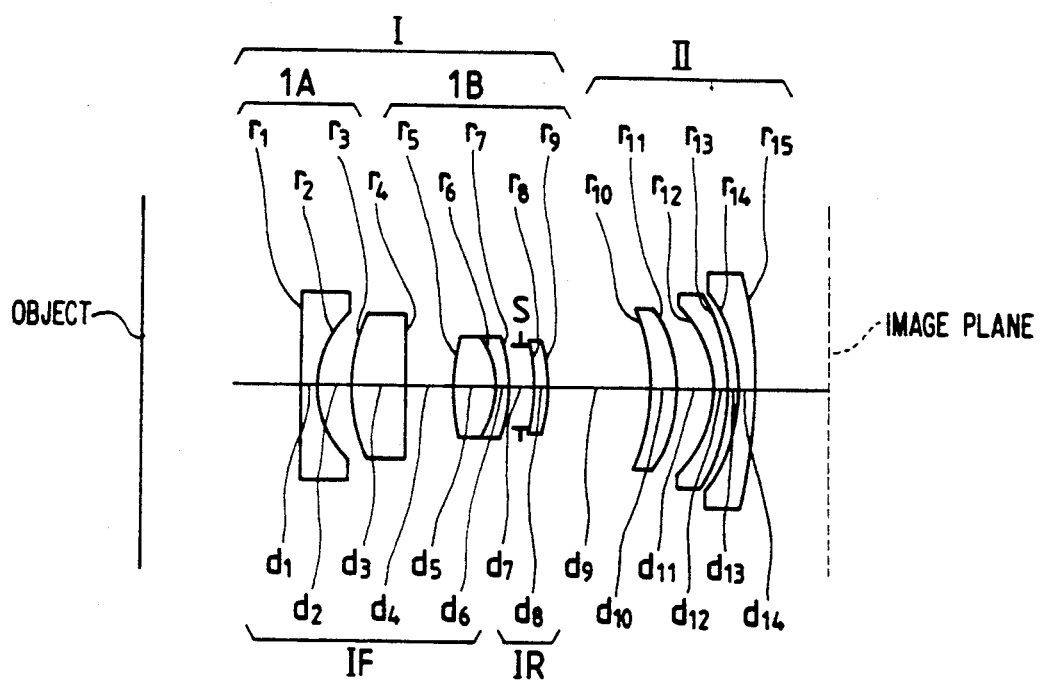
Figure 12A:
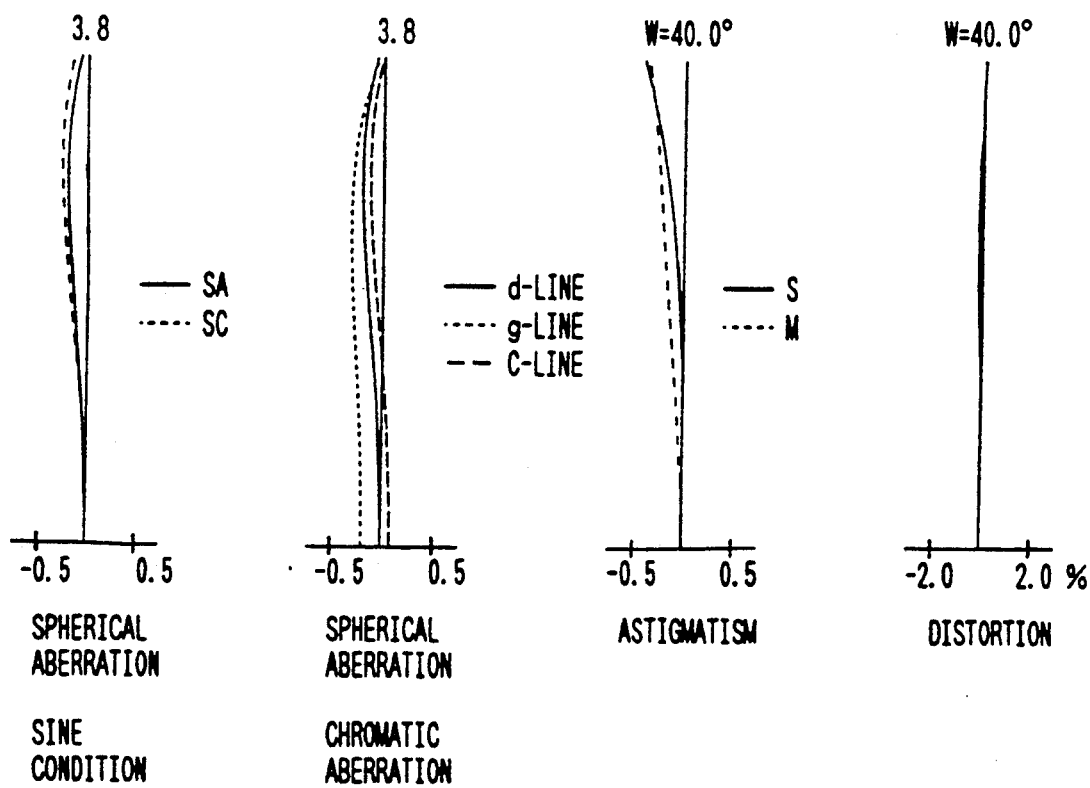

FIG. 11 is a simplified cross-sectional view of the zoom lens system of Example 6 for the case where it is at the wide-angle end. The specific composition of this lens system is shown in Table 6 below. The aberration curves obtained with this lens system are plotted by graphs in FIGS. 12a, 12b and 12c for the respective cases where it is at the wide-angle end, middle-angle end and narrow-angle end.

TABLE 6

FNo. = 1:3.9~7.3  f = 25.80~48.70
ω = 40.0~24.4  fB = 8.90~39.08

| Surface No. | r | d | n | ν |
|---|---|---|---|---|
| 1 | 876.511 | 1.600 | 1.69350 | 53.2 |
| 2* | 10.223 | 3.248 | | |
| 3 | 17.370 | 5.000 | 1.66998 | 39.3 |
| 4 | −601.805 | 4.462 | | |
| 5 | 23.359 | 3.738 | 1.48749 | 70.2 |
| 6 | −9.076 | 1.400 | 1.84666 | 23.8 |
| 7 | −13.008 | 2.295 | | |
| 8 | −17.208 | 1.400 | 1.58913 | 61.2 |
| 9* | −13.818 | 9.500~1.967 | | |
| 10 | −19.603 | 2.521 | 1.80518 | 25.4 |
| 11 | −13.686 | 3.508 | | |
| 12 | −11.315 | 1.350 | 1.83400 | 37.2 |
| 13 | −19.287 | 1.078 | | |
| 14 | −15.881 | 1.400 | 1.83400 | 37.2 |
| 15 | −48.825 | | | |

| Second Aspherical Surface | Ninth Aspherical Surface |
|---|---|
| K = 0 | K = 0 |
| $a_4 = 0.17374444 \times 10^{-4}$ | $a_4 = 0.65104624 \times 10^{-4}$ |
| $a_6 = 0.12436375 \times 10^{-6}$ | $a_6 = 0.60185736 \times 10^{-6}$ |

TABLE 6-continued $a_8 = 0.10596746 \times 10^{-8}$     $a_8 = -0.62908577 \times 10^{-8}$

EXAMPLE 7

Figure 13:
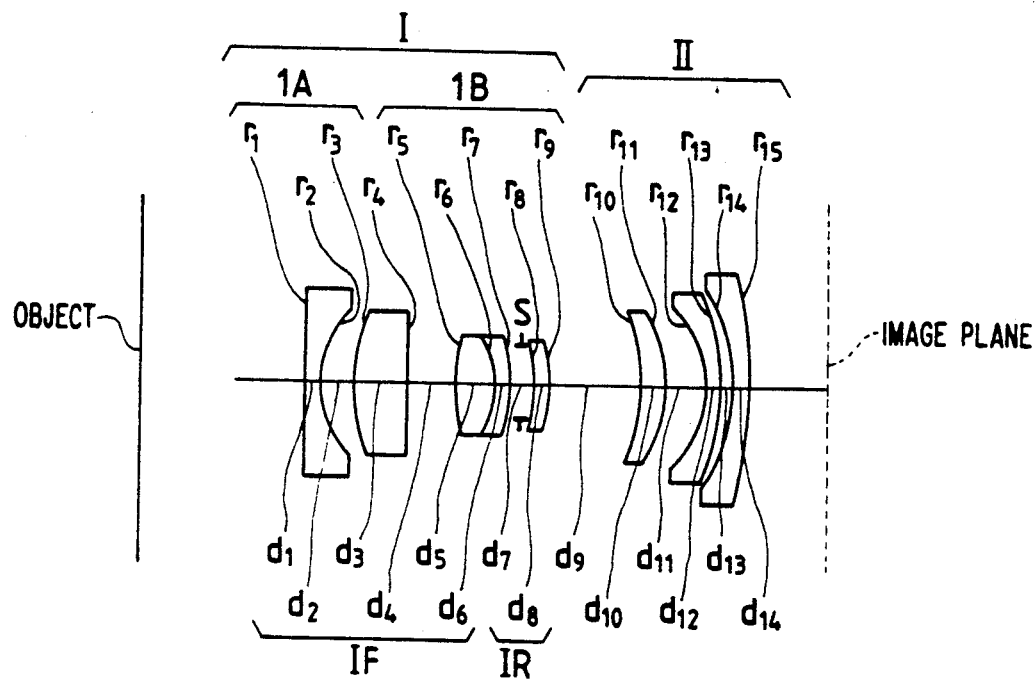
Figure 14A:
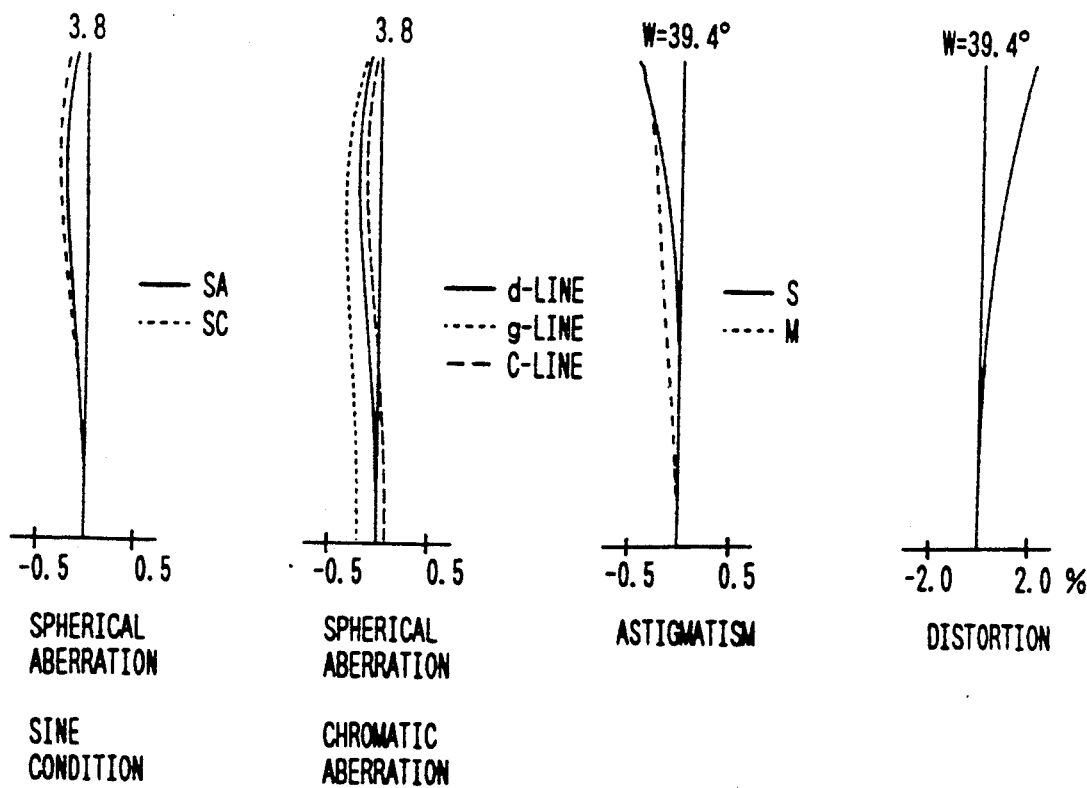

FIG. 13 is a simplified cross-sectional view of the zoom lens system of Example 7 for the case where it is at the wide-angle end. The specific composition of this lens system is shown in Table 7 below. The aberration curves obtained with this lens system are plotted by graphs in FIGS. 14a, 14b and 14c for the respective cases where it is at the wide-angle end, middle-angle end and narrow-angle end.

TABLE 7

FNo. = 1:3.9~7.3   f = 25.82~48.70
ω = 39.4~24.3   fB = 8.69~36.52

| Surface No. | r | d | n | ν |
|---|---|---|---|---|
| 1 | 238.699 | 1.700 | 1.73077 | 40.5 |
| 2* | 10.401 | 3.177 | | |
| 3 | 17.035 | 5.100 | 1.68893 | 31.1 |
| 4 | 638.388 | 4.466 | | |
| 5 | 20.575 | 3.746 | 1.48749 | 70.2 |
| 6 | −9.248 | 1.370 | 1.84666 | 23.8 |
| 7 | −13.285 | 2.237 | | |
| 8 | −18.548 | 1.400 | 1.58913 | 61.2 |
| 9* | −14.433 | 8.500~1.973 | | |
| 10 | −18.920 | 2.374 | 1.80518 | 25.4 |
| 11 | −13.583 | 3.826 | | |
| 12 | −10.918 | 1.350 | 1.83400 | 37.2 |
| 13 | −21.742 | 1.101 | | |
| 14 | −17.036 | 1.400 | 1.83400 | 37.2 |
| 15 | −48.906 | | | |

| Second Aspherical Surface | Ninth Aspherical Surface |
|---|---|
| K = 0 | K = 0 |
| $a_4 = -0.21526709 \times 10^{-4}$ | $a_4 = 0.73223433 \times 10^{-4}$ |
| $a_6 = 0.15131036 \times 10^{-6}$ | $a_6 = 0.68860501 \times 10^{-6}$ |
| $a_8 = 0.27716102 \times 10^{-8}$ | $a_8 = -0.78205791 \times 10^{-8}$ |

EXAMPLE 8

Figure 15:
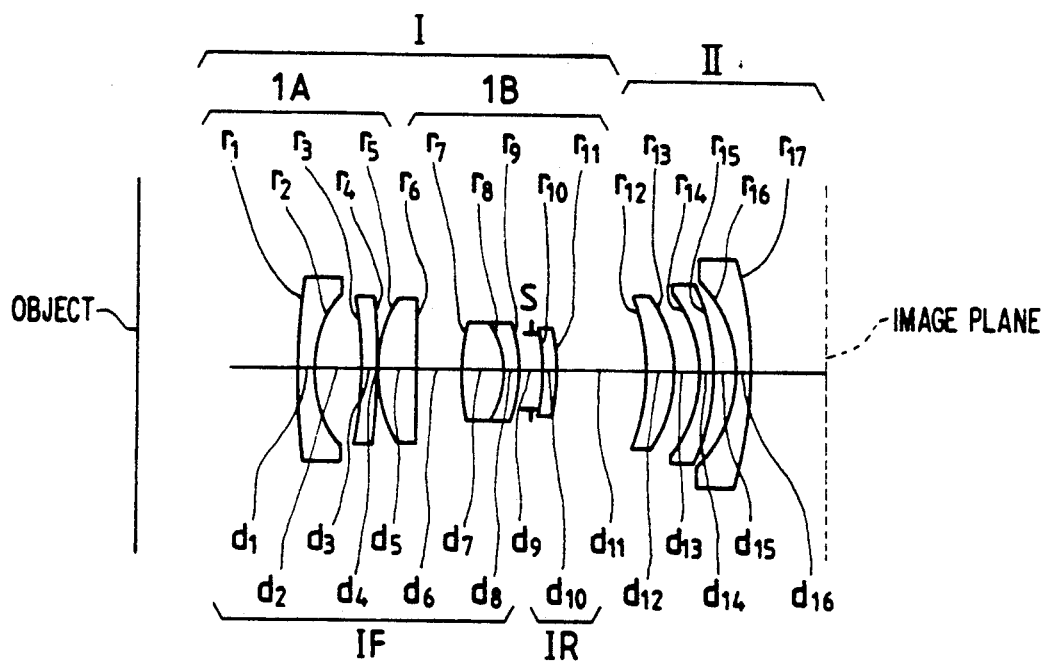
Figure 16A:
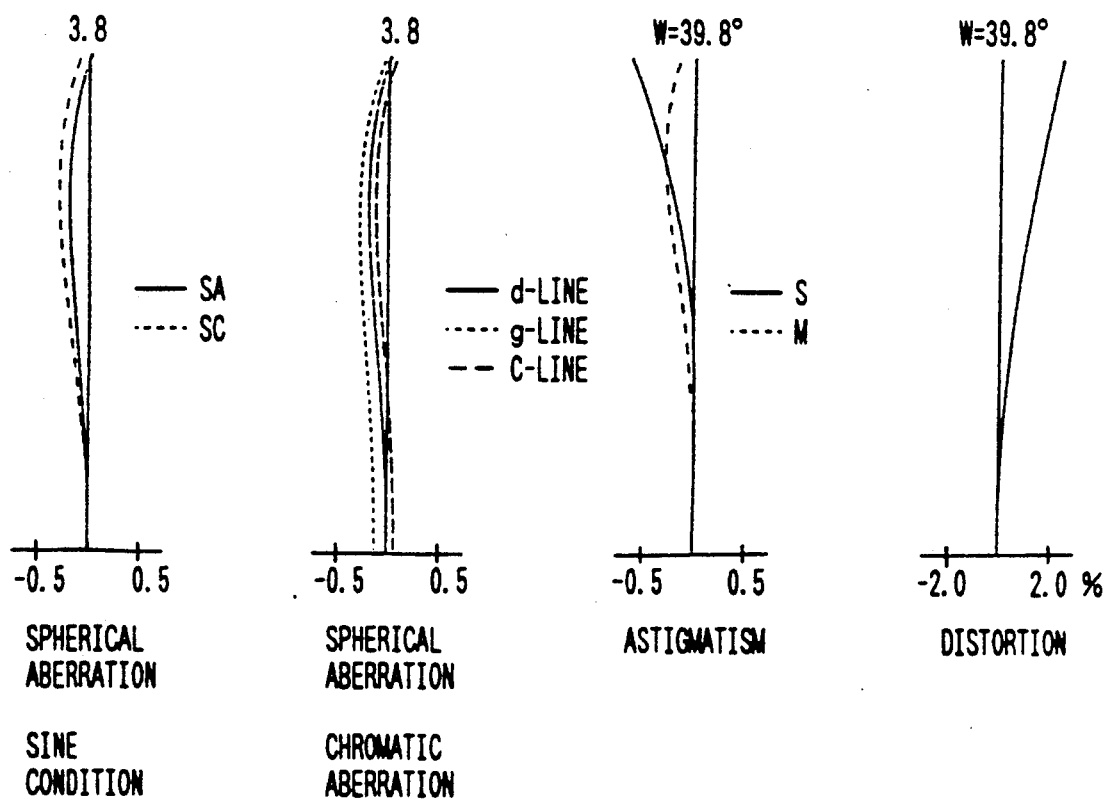

FIG. 15 is a simplified cross-sectional view of the zoom lens system of Example 8 for the case where it is at the wide-angle end. The specific composition of this lens system is shown in Table 8 below. The aberration curves obtained with this lens system are plotted by graphs in FIGS. 16a, 16b and 16c for the respective cases where it is at the wide-angle end, middle-angle end and narrow-angle end.

TABLE 8

FNo. = 1:3.9~7.3   f = 25.90~48.70
ω = 39.4~24.2   fB = 8.83~35.88

| Surface No. | r | d | n | ν |
|---|---|---|---|---|
| 1 | 1443.794 | 1.400 | 1.83400 | 37.2 |
| 2 | 11.812 | 2.772 | | |
| 3 | 67.472 | 3.916 | 1.58144 | 40.8 |
| 4 | −194.810 | 0.200 | | |
| 5 | 15.316 | 2.858 | 1.71736 | 29.5 |
| 6 | 60.943 | 4.903 | | |
| 7 | 19.762 | 3.619 | 1.48749 | 70.2 |
| 8 | −10.490 | 1.370 | 1.84666 | 23.8 |
| 9 | −17.287 | 2.149 | | |
| 10 | −21.898 | 1.400 | 1.58913 | 61.2 |
| 11* | −15.336 | 7.978~1.972 | | |
| 12 | −17.425 | 2.405 | 1.80518 | 25.4 |
| 13 | −12.709 | 3.121 | | |
| 14 | −11.727 | 1.350 | 1.83400 | 37.2 |
| 15 | −20.270 | 1.830 | | |
| 16 | −12.933 | 1.400 | 1.83400 | 37.2 |
| 17 | −37.750 | | | |

| Eleventh Aspherical Surface |
|---|
| K = 0 |
| $a_4 = 0.94263001 \times 10^{-4}$ |
| $a_6 = 0.54581618 \times 10^{-6}$ |
| $a_8 = -0.24459758 \times 10^{-8}$ |

EXAMPLE 9

Figure 17:
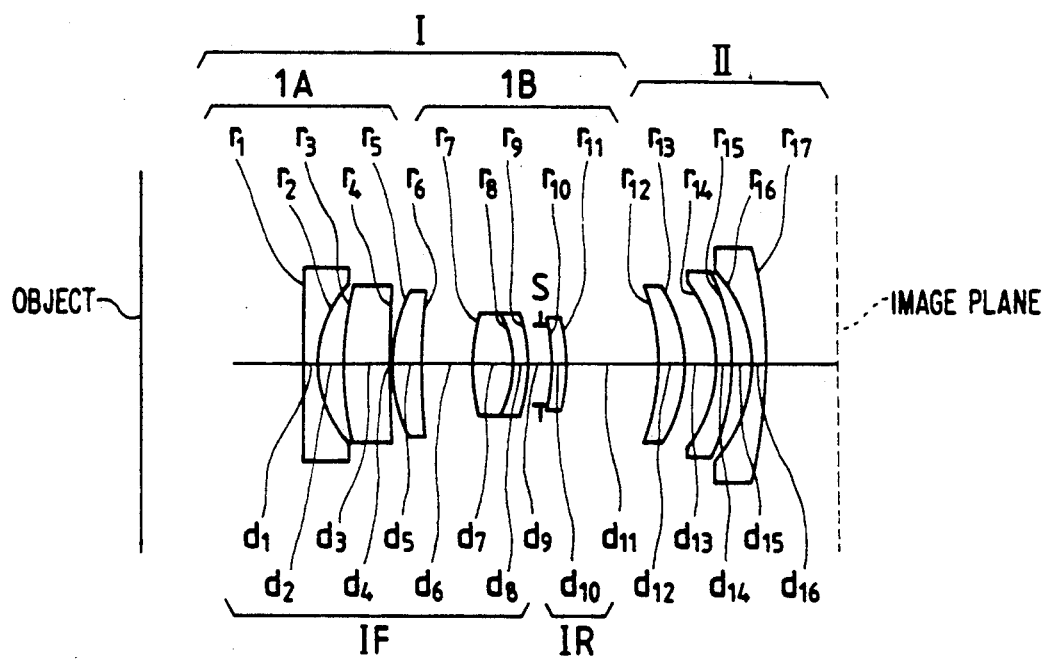
Figure 18A:
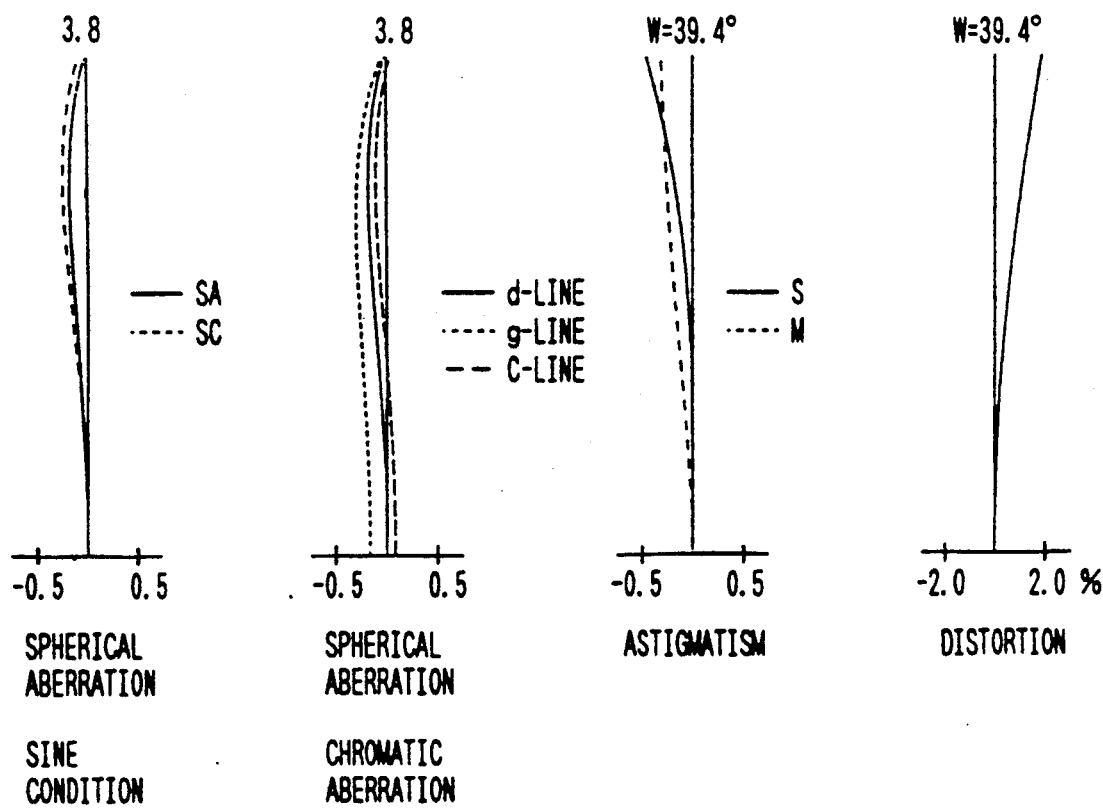

FIG. 17 is a simplified cross-sectional view of the zoom lens system of Example 9 for the case where it is at the wide-angle end. The specific composition of this lens system is shown in Table 9 below. The aberration curves obtained with this lens system are plotted by graphs in FIGS. 18a, 18b and 18c for the respective cases where it is at the wide-angle end, middle-angle end and narrow-angle end.

TABLE 9

FNo. = 1:3.9~7.3   f = 25.90~48.70
ω = 39.4~24.2   fB = 8.76~36.27

| Surface No. | r | d | n | ν |
|---|---|---|---|---|
| 1 | −5000.000 | 1.400 | 1.77250 | 49.6 |
| 2 | 11.061 | 2.493 | | |
| 3 | 36.851 | 4.274 | 1.53172 | 48.9 |
| 4 | 860.513 | 0.200 | | |
| 5 | 16.692 | 2.720 | 1.70154 | 41.2 |
| 6 | 80.849 | 4.749 | | |
| 7 | 22.976 | 3.575 | 1.48749 | 70.2 |
| 8 | −10.328 | 1.370 | 1.84666 | 23.8 |
| 9 | −15.343 | 2.137 | | |
| 10 | −22.859 | 1.400 | 1.49176 | 57.4 (plastic) |
| 11* | −16.333 | 8.441~1.966 | | |
| 12 | −19.724 | 2.470 | 1.80518 | 25.4 |
| 13 | −13.453 | 3.027 | | |
| 14 | −12.053 | 1.350 | 1.83400 | 37.2 |
| 15 | −20.523 | 1.737 | | |
| 16 | −13.445 | 1.400 | 1.83400 | 37.2 |
| 17 | −44.567 | | | |

| Eleventh Aspherical Surface |
|---|
| K = 0 |
| $a_4 = 0.92759807 \times 10^{-4}$ |
| $a_6 = 0.72599846 \times 10^{-6}$ |
| $a_8 = -0.52886433 \times 10^{-8}$ |

The following table lists the values that satisfy the conditions (a)-(j) in Examples 1-9.

| Condition | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| f1/f1 | −1.10 | −1.18 | −1.20 | −1.17 | −1.19 | −1.19 | −1.15 | −1.17 | −1.21 |
| r2/fS | 0.44 | 0.42 | 0.42 | 0.44 | 0.46 | 0.40 | 0.40 | 0.46 | 0.43 |
| f1/f1A | −0.066 | −0.060 | −0.10 | −0.16 | −0.14 | −0.33 | −0.33 | −0.14 | −0.16 |
| r1A/fS | 0.54 | 0.53 | 0.61 | 0.56 | 0.58 | 0.67 | 0.66 | 0.59 | 0.64 |
| da/fS | 0.24 | 0.23 | 0.22 | 0.22 | 0.21 | 0.13 | 0.12 | 0.27 | 0.27 |
| Δl1A | −9.4 | −7.2 | −0.6 | −5.2 | −5.1 | −1.7 | −2.1 | | |
| f1/fC | 0.64 | 0.57 | 0.66 | 0.69 | 0.68 | 0.81 | 0.82 | 0.65 | 0.71 |
| f1/f1R | 0.15 | 0.14 | 0.16 | 0.17 | 0.18 | 0.17 | 0.18 | 0.21 | 0.16 |
| $r_{1R}$/fS | −0.91 | −0.75 | −0.66 | −0.66 | −1.0 | −1.1 | −0.72 | −0.85 | −0.88 |

-continued

| Condition | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $\Delta I1R$ | −11.3 | −11.1 | −18.6 | −13.2 | −9.7 | −13.3 | −13.8 | −17.1 | −14.2 |

As described on the foregoing pages, the present invention provides a zoom lens system for use with a compact camera that is of a simple tow-group type and that yet features wider view angles by modifying the composition of the first lens group and the stop diaphragm. This lens system offers another advantage in that it experiences small aberrational variations over the full zooming range of from the wide-angle to the narrow-angle or over the full focusing range of from infinity to near distance.

What is claimed is:

1. In a zoom lens system that comprises, in order from the object side, a first lens group having a positive focal length and a second lens group having a negative focal length and that performs zooming by changing the distance between said first and second lens groups, the improvement wherein said first lens group has a negative lens element on the side closest to an object that has a concave surface of large curvature directed towards an image plane and said first lens group satisfies the following conditions (a) and (b):

$$-1.5 < f1/f1 < -0.8 \text{ (a)}$$

$$0.3 < r2/fS < 0.6 \text{ (b)}$$

where
  f1: the focal length of the firs lens group;
  f1: the focal length of the negative lens element in the first lens group;
  r2: the curvature radius of the concave surface of the first lens element on the image side; and
  fS: the focal length of the overall system at the wide-angle end.

2. In a zoom lens system that comprises, in order from the object side, a first lens group having a positive focal length and a second lens group having a negative focal length and that performs zooming by changing the distance between said first and second lens groups, the improvement wherein said first lens group comprises, in order from the object side, a first lens unit 1A and a positive second lens unit 1B, and wherein said first lens unit 1A includes a negative first lens element having a concave surface of large curvature directed towards an image plane on the side of said lens unit 1A that is the closest to an object, and a positive lens element having a convex surface of large curvature directed towards the object on the side of said lens unit 1A that is the closest to the image plane, and said lens unit 1A satisfies the following conditions (c), (d) and (e):

| (c) | $-0.5 < f1/f1A < 0.3$ |
| (d) | $0.4 < r1A/fS < 0.8$ |
| (e) | $0.05 < da/fS < 0.4$ | where
  f1: the focal length of the firs lens group;
  f1A: the focal length of the lens unit 1A;
  r1A: the curvature radius of the concave surface on the object side of the positive lens element of the lens unit 1A;
  fS: the focal length of the overall system at the wide-angle end: and
  da: the distance from the concave surface on the image side of the negative first lens element in the lens unit 1A to the convex surface on the object side of the lens element on the image side.

3. A zoom lens system according to claim 2 wherein the lens unit 1A includes at least one aspheric surface that is divergent and that satisfies the following condition (f) with respect to a reference spherical surface defined by a paraxial curvature radius of said aspheric surface:

$$-20 < \Delta I1A \leq 0$$

where
  $\Delta I1A$: the amount of variation in the coefficient of the third-order spherical aberration due to the aspheric surface in the lens unit 1A, and wherein the aberration coefficient is obtained when fS is regarding as unity; and
  fS: the focal length of the overall system at the wide-angle end.

4. In a zoom lens system that comprises, in order from the object side, a first lens group having a positive focal length and a second lens group having a negative focal length and that performs zooming by changing the distance between said first and second lens groups, the improvement wherein said first lens group comprises, in order from the object side, a first lens unit 1A and a positive second lens unit 1B, said lens unit 1B comprises, in order from the object side, a cemented lens that consists of a biconvex lens element and a negative meniscus lens element and that has a divergent cemented interface, a stop diaphragm and a positive lens element 1R, said lens unit 1B satisfying the following conditions (g) and (h):

$$0.4 < f1/fC < 1.0 \text{(g)}$$

$$0 < f1/F1R < 0.4 \text{(h)}$$

where
  f1: the focal length of the first lens group;
  fC: the composite focal length of the cemented lens in the lens unit 1B; and
  F1R: the focal length of the lens element 1R in the lens unit 1B.

5. A zoom lens system according to claim 4 wherein said lens element 1R is a positive meniscus lens that has a concave surface directed towards an object and that satisfies the following condition (i):

$$-1.5 < r_{1R}/fS < -0.5$$

where
  $r_{1R}$: the curvature radius of the surface of the lens element 1R on the object side; and
  fS: the focal length of the overall system at the wide-angle end.

6. A zoom lens system according to claim 4 wherein focusing is performed by moving said first lens group to change the distance between said cemented lens and said lens element IR.

7. A zoom lens system according to claim 6 wherein during focusing, the stop diaphragm and the lens element 1R remain fixed while the lens elements of said first lens unit 1A and the lens elements of said second lens unit 1B that are closer to the object than the lens element 1R are moved.

8. A zoom lens system according to claim 4 wherein said lens element 1R is made of a plastic material.

9. A zoom lens system according to claim 4 said lens unit 1R has at least one aspheric surface that is divergent and that satisfies the following condition (j) with respect to a reference spherical surface which is defined by a paraxial curvature radius of said aspheric surface:

$$-30 < \Delta I1R < 0 \quad (j)$$

where $\Delta I1R$: the amount of variation in the coefficient of the third-order spherical aberration due to the aspheric surface of the lens element 1R, and wherein the aberration coefficient is obtained when fS is regarded as unity; and fS: the focal length of the overall system at the wide-angle end.

10. In a zoom lens system that comprises, in order from the object side, a first lens group having a positive focal length and a second lens group having a negative focal length and that performs zooming by changing the distance between said first and second lens groups, the improvement wherein said first lens group comprises, in order from the object side, a front lens unit 1F, a stop diaphragm and a negative rear lens unit 1R, said front lens unit 1F having a negative first lens element on the side closest to an object and having a positive overall power, with focusing being performed by changing the distance between said lens unit 1F and said lens unit 1R in said first lens group, at least said lens unit 1 being moved towards the object when said distance between said lens unit 1F and said lens unit 1R is increased, and said first lens group satisfying the conditions (a) and (h):

$$-1.5 < f1/f1 < -0.8 \quad (a)$$

$$0 < f1/f1R < 0.4 \quad (h)$$

where f1: the focal length of the firs lens group;

f1: the focal length of the first lens element in the first lens group; and

F1R: the focal length of the lens unit 1R in the first lens group.

11. A zoom lens system according to claim 10 wherein said lens unit 1R comprises positive meniscus lens that has a concave surface directed towards the object and that satisfies the following condition (i):

$$-1.5 < r_{1R}/fS < -0.5 \quad (i)$$

where $r_{1R}$: the curvature radius of the surface of the lens element 1R on the object side; and fS: the focal length of the overall system at the wide-angle end.

12. A zoom lens system according to claim 10 wherein said lens unit 1R is made of a plastic material.

13. A zoom lens system according to claim 10 wherein said lens unit 1R has at least one aspheric surface that is divergent and that satisfies the following condition (j) with respect to a reference spherical surface which is defined by a paraxial curvature radius of the aspheric surface:

$$-30 < \Delta I1R < 0 \quad (j)$$

where $\Delta I1R$: the amount of variation in the coefficient of the third-order spherical aberration due to the aspheric surface of the lens element 1R, and wherein the aberration coefficient is obtained when fS is regarded as unity; and fS: the focal length of the overall system at the wide-angle end.

14. A zoom lens system according to claim 10 wherein during focusing, the stop diaphragm and the lens unit 1R remain fixed while the front lens unit 1F is moved.

* * * * *